US011758840B2

(12) United States Patent
Farley et al.

(10) Patent No.: US 11,758,840 B2
(45) Date of Patent: Sep. 19, 2023

(54) AGRICULTURAL HARVESTER WITH HEADER HAVING CONFORMABLE PORTIONS

(71) Applicant: CNH Industrial America LLC, New Holland, PA (US)

(72) Inventors: Herbert M. Farley, Elizabethtown, PA (US); Blaine R. Noll, Fleetwood, PA (US); Benjamin Kemmerer, Hamburg, PA (US)

(73) Assignee: CNH Industrial America LLC, New Holland, PA (US)

( * ) Notice: Subject to any disclaimer, the term of this patent is extended or adjusted under 35 U.S.C. 154(b) by 508 days.

(21) Appl. No.: 16/959,309

(22) PCT Filed: Jan. 4, 2019

(86) PCT No.: PCT/US2019/012391
§ 371 (c)(1),
(2) Date: Jun. 30, 2020

(87) PCT Pub. No.: WO2019/136281
PCT Pub. Date: Jul. 11, 2019

(65) Prior Publication Data
US 2021/0227750 A1 Jul. 29, 2021

Related U.S. Application Data

(60) Provisional application No. 62/613,623, filed on Jan. 4, 2018.

(51) Int. Cl.
*A01D 41/14* (2006.01)
*A01D 34/28* (2006.01)
*A01D 34/24* (2006.01)

(52) U.S. Cl.
CPC .......... *A01D 34/283* (2013.01); *A01D 34/24* (2013.01); *A01D 41/14* (2013.01); *A01D 41/144* (2013.01)

(58) Field of Classification Search
CPC ...... A01D 34/24; A01D 34/28; A01D 34/286; A01D 34/283; A01D 41/141; A01D 41/144; A01D 41/14
See application file for complete search history.

(56) References Cited

U.S. PATENT DOCUMENTS 4,409,780 A * 10/1983 Beougher ............... A01B 73/02
56/228
4,487,004 A * 12/1984 Kejr ....................... A01D 41/14
56/297

(Continued)

FOREIGN PATENT DOCUMENTS

| EP | 1867228 A1 | 12/2007 |
| EP | 3087819 A2 | 11/2016 |
| WO | 2009136269 A1 | 11/2009 |

OTHER PUBLICATIONS

International Search Report and Written Opinion for Application No. PCT/US2019/012391 dated Mar. 1, 2019 (12 pages).

*Primary Examiner* — Adam J Behrens
(74) *Attorney, Agent, or Firm* — Peter K. Zacharias

(57) ABSTRACT

An agricultural header includes a header frame and at least one harvesting element carried by the header frame. The header frame includes a rigid portion, a first conformable portion flexibly coupled to the rigid portion by a first resilient material that allows at least about 1.5° of reversible deflection, and a second conformable portion flexibly coupled to the rigid portion by a second resilient material that allows at least about 1.5° of reversible deflection.

18 Claims, 5 Drawing Sheets

(56) References Cited

U.S. PATENT DOCUMENTS

| | | | | |
|---|---|---|---|---|
| 7,614,206 | B2* | 11/2009 | Tippery | A01D 41/144 |
| | | | | 56/15.8 |
| 10,070,575 | B2* | 9/2018 | Wenger | A01B 73/06 |
| 10,433,483 | B2* | 10/2019 | Cook | A01B 73/06 |
| 10,433,486 | B2* | 10/2019 | Vandeven | A01D 41/14 |
| 10,568,266 | B2* | 2/2020 | Vandeven | A01D 41/145 |
| 10,624,260 | B2* | 4/2020 | Shearer | A01D 34/283 |
| 2008/0295473 | A1* | 12/2008 | Tippery | A01D 41/144 |
| | | | | 56/153 |
| 2013/0104508 | A1 | 5/2013 | Ritter et al. | |
| 2015/0013795 | A1* | 1/2015 | Ritter | A01D 41/145 |
| | | | | 137/596.16 |
| 2019/0110402 | A1* | 4/2019 | Vandeven | A01D 41/144 |

\* cited by examiner

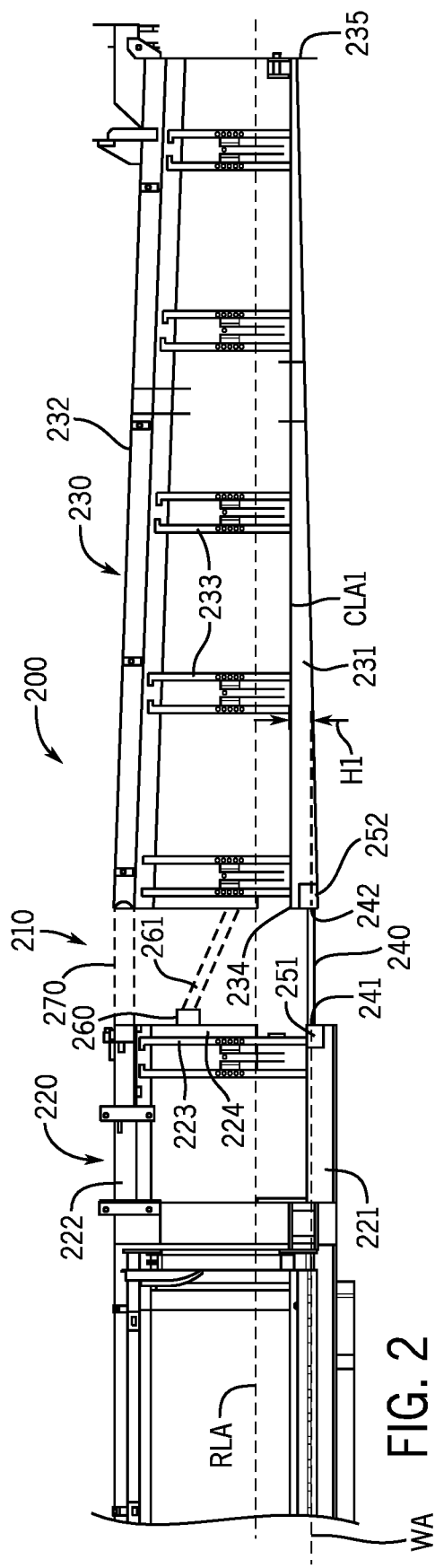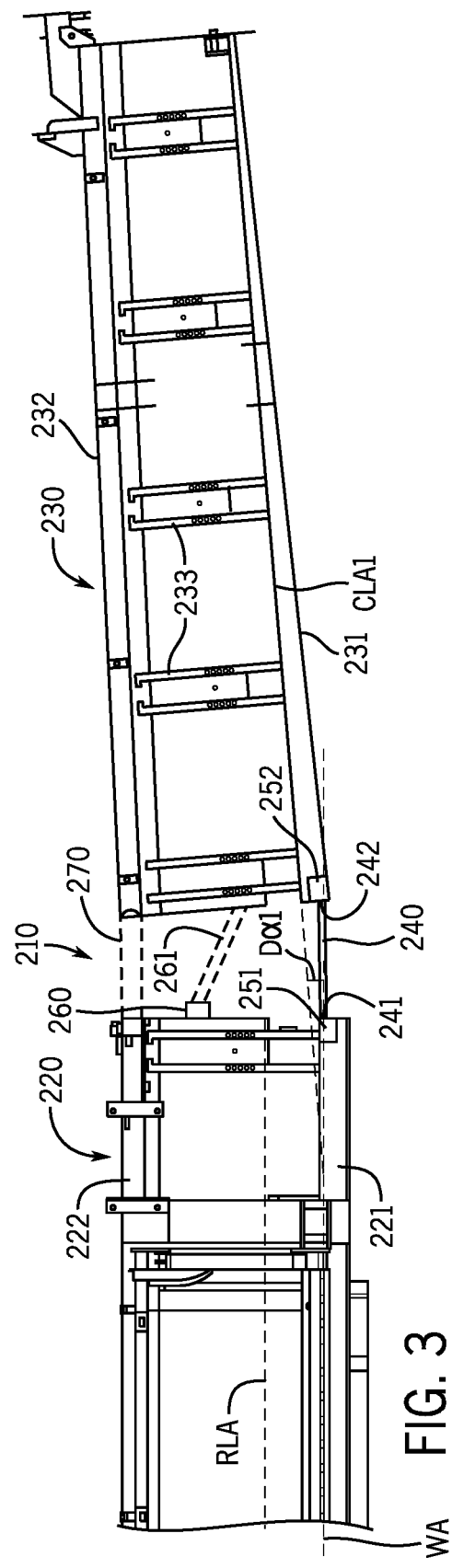

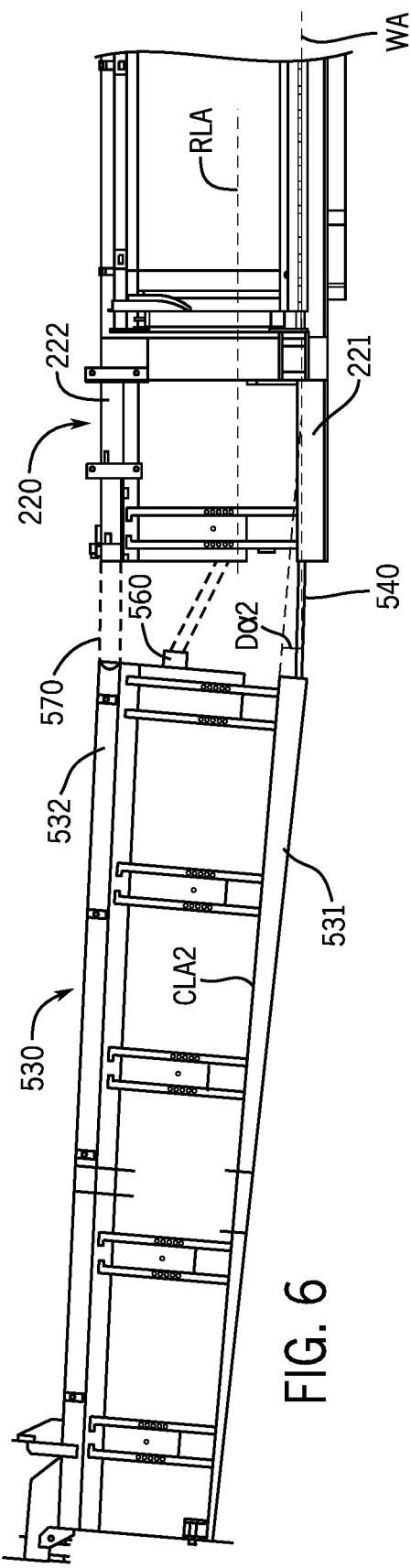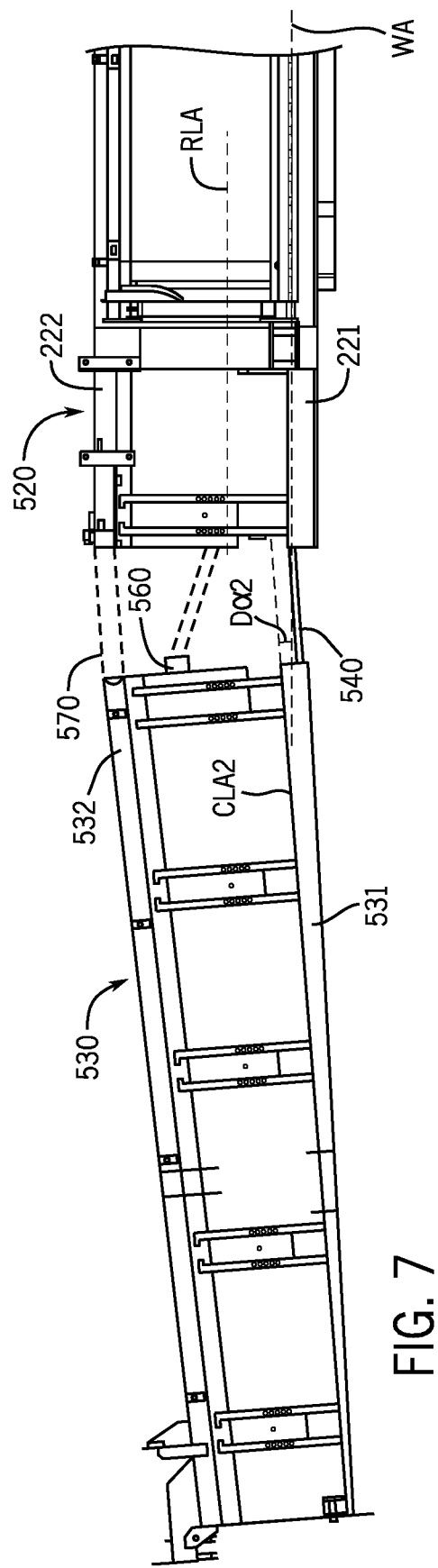

AGRICULTURAL HARVESTER WITH HEADER HAVING CONFORMABLE PORTIONS

BACKGROUND

Harvesters such as windrowers, tractors, and forage harvesters, are equipped with headers to harvest crops in a field. A typical header includes a header frame carrying one or more harvesting elements, such as a cutter bar or sickle, that engage and separate the crop material from the field for collection by the harvester. The header also typically includes some type of conveying mechanism, such as a pair of rotating augers or belts, that will convey cut crop material toward a center of the header and rearwardly into the harvester for further processing and/or transport.

To more quickly collect crop material from fields, current design trends have been to make the header of harvesters relatively wide so fewer passes are needed to harvest crop material from an entire field, which can save the user a considerable amount of time. The header is generally the widest part of a harvester; some headers have, for example, operating widths of 40 feet or more, such as 60 feet.

While increasing the width of the header allows for quicker collection of crop material, one particular issue that results from widening the header is the increased width makes it difficult to maintain a constant cut across the width of the harvester, especially when the harvester encounters a terrain irregularity. Approaches to overcome this issue have included the development of flexible cutter bars in the header that can flex in response to the header traversing a terrain irregularity, but in some instances the flexible range of the flexible cutter bar is not enough to account for the terrain irregularity, which leads to an uneven cut.

SUMMARY

The disclosure relates to a header with a flexible header frame including a rigid portion with conformable portions flexibly coupled to the rigid portion by resilient material.

In some exemplary embodiments, an agricultural header includes a header frame and at least one harvesting element carried by the header frame. The header frame includes a rigid portion; a first conformable portion flexibly coupled to the rigid portion by a first resilient material that allows at least 1.5° of reversible deflection; and a second conformable portion flexibly coupled to the rigid portion by a second resilient material that allows at least 1.5° of reversible deflection. In some embodiments, the first and/or second conformable portion is free of a hinge.

In some exemplary embodiments, an agricultural harvester includes a chassis and a header carried by the chassis. The header includes a header frame and at least one harvesting element carried by the flexible header frame. The header frame includes a rigid portion; a first conformable portion flexibly coupled to the rigid portion by a first resilient material that allows at least 1.5° of reversible deflection; and a second conformable portion flexibly coupled to the rigid portion by a second resilient material that allows at least 1.5° of reversible deflection.

One possible benefit that may be realized by exemplary embodiments disclosed herein is the conformable portions are capable of precisely conforming to irregular terrain in order to produce a uniform cut.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed harvester and header, reference is made to the accompanying figures, wherein:

FIG. 2 is a rear view of a portion of an exemplary embodiment of a header frame with a first resilient material in an undeflected state;

FIG. 3 is a rear view of the flexible header frame shown in FIG. 2 when the first resilient material has deflected upward;

FIG. 6 is a rear view of the flexible header frame shown in FIG. 5 when the second resilient material has deflected upward;

FIG. 7 is a rear view of the flexible header frame shown in FIGS. 4-5 when the second resilient material has deflected downward.

DETAILED DESCRIPTION

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "about" as used herein when referring to a measurable value such as an amount, a temporal duration, and the like, is meant to encompass variations of ±20%, ±10%, ±5%, ±1%, or ±0.1% from the specified value, as such variations are appropriate to perform the disclosed methods. For recitation of numeric ranges herein, each intervening number therebetween with the same degree of precision is explicitly contemplated. For example, for the range of 6-9, the numbers 7 and 8 are contemplated in addition to 6 and 9, and for the range 6.0-7.0, the numbers 6.0, 6.1, 6.2, 6.3, 6.4, 6.5, 6.6, 6.7, 6.8, 6, 9, and 7.0 are explicitly contemplated.

The term "plurality" as used herein is defined as any amount or number greater or more than 1. In some embodiments, the term "plurality" means 2, 3, 4, 5, 6 or more.

The terms "left" or "right" are used herein as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes.

The term "harvester" as used herein is defined as a machine that consolidates and/or packages material so as to facilitate the storage and handling of the material for later use. In some embodiments, the harvester is used to harvest agricultural material. In some embodiments, the harvester is a windrower, a forage harvester, or a combine harvester. In some embodiments, the harvester is a self-propelled windrower.

Many of the fastening, connection, processes and other means and components utilized in this disclosure are widely known and used in the field of the disclosure described, and their exact nature or type is not necessary for an understanding and use of the disclosure by a person skilled in the art, and they will not therefore be discussed in significant detail. Furthermore, the various components shown or described herein for any specific application of this disclosure can be varied and the practice of a specific application of any element may already be widely known or used in the art by persons skilled in the art and each will likewise not therefore be discussed in significant detail.

Figure 1:
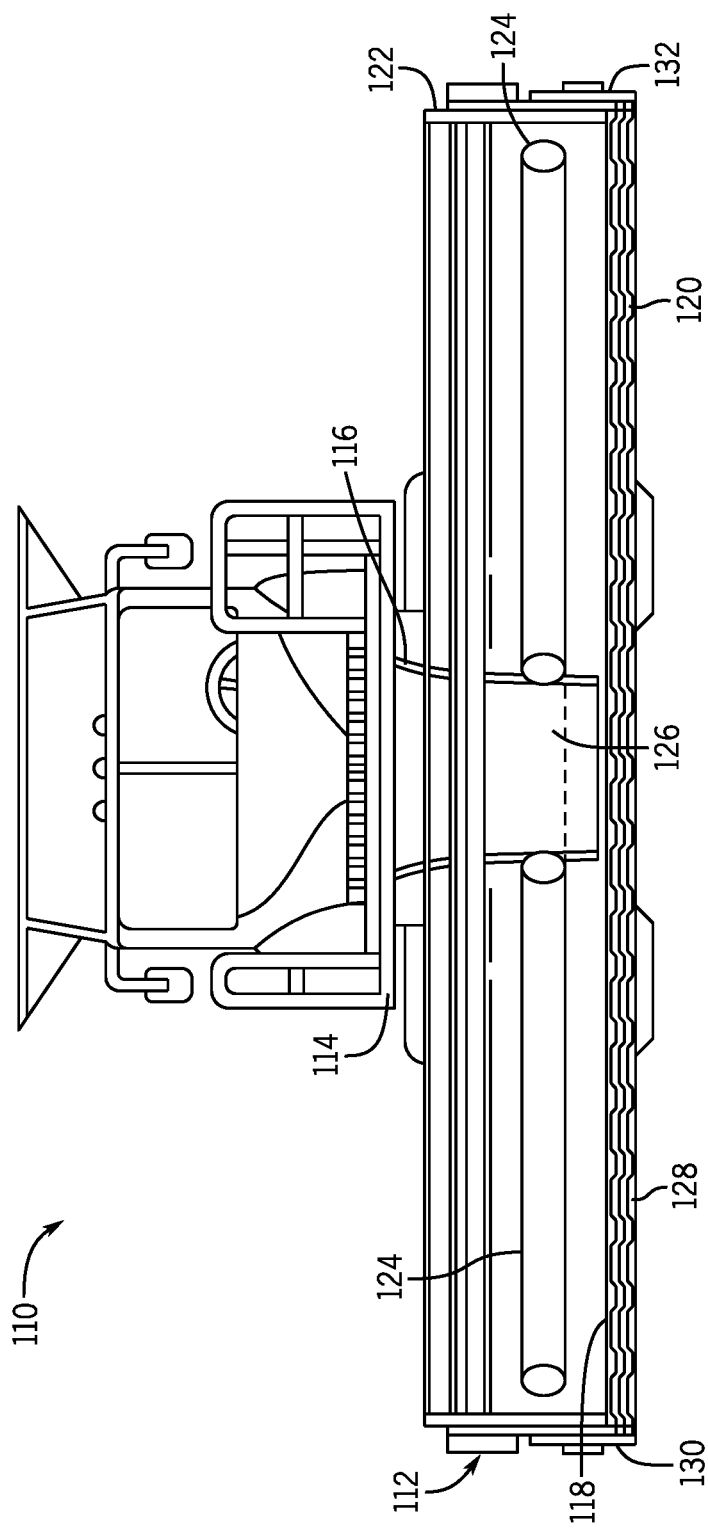
FIG. 1 is a front view of a known agricultural harvester.

Referring now to the drawings, and more particularly to FIG. 1, an exemplary embodiment of an agricultural harvester 110, such as a combine, is illustrated. Harvester 110 includes a chassis 111 that carries a header 112 which is attached to a forward end 114 of the harvester 110 and which is configured to cut crops and to induct the cut crops into a feederhouse 116, also carried by the chassis 111, as harvester 110 moves forward over a crop field. Feederhouse 116 is configured to convey the cut crops into harvester 110 for threshing and cleaning.

In some exemplary embodiments, the header 112 includes a floor 118 that is supported in desired proximity to the surface of a crop field and at least one harvesting element 120, which may be, for example, a cutter bar, elongate sickle or knife assembly that extends transversely along a forward edge of the floor 118. The at least one harvesting element 120 is configured to cut or otherwise sever crops from the field in preparation for induction into the feederhouse 116. Additionally, header 112 includes an elongate, transversely extending harvesting reel 122 disposed above the sickle assembly 120. Harvesting reel 122 is rotatable in a direction suitable for facilitating the induction of severed crops into feederhouse 116. Header 112 further includes a pair of side draper conveyors 124 which receive crop from the harvesting reel and transfer the severed crop to a central feed draper conveyor 126. Upon receipt of the crop from the side draper conveyors, the feed draper conveyor delivers the crop to feederhouse 116. Header 112 may also include an optional auger positioned above the feed draper conveyor 126 to facilitate feeding of severed crop to the feederhouse 116. Alternatively, it will be understood that other conveyors such as an auger conveyor generally spanning the header and capable of delivering severed crop to the feederhouse 116 may be deployed in lieu of a feed draper conveyor and side draper conveyors as the characteristics of the crop being harvested may warrant.

Figure 4:
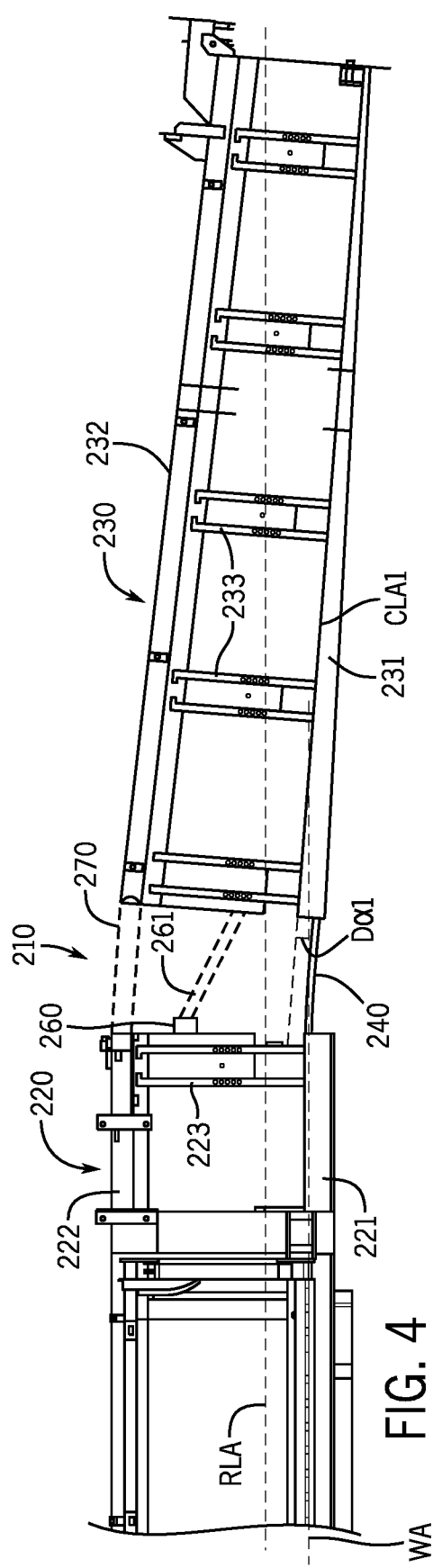
FIG. 4 is a rear view of the flexible header frame shown in FIGS. 2-3 when the first resilient material has deflected downward.

Referring now to FIGS. 2-4, an exemplary embodiment of a header 200 is illustrated that may be incorporated in the harvester 110. The illustrated header 200 may be substantially similar to the header 112 shown in FIG. 1, except that the header 200 includes a header frame 210 including a rigid portion 220, a first conformable portion 230 flexibly connected to the rigid portion 220, and a second conformable portion 530 (shown in FIGS. 5-7) flexibly connected to the rigid portion 220. As used herein, the portion 220 is "rigid" in the sense that, during operation, the rigid portion 220 will display little, if any, appreciable deformation. The header frame 210 may carry one or more harvesting elements 120, which, in some exemplary embodiments, may be one or more flexible cutter bars. The rigid portion 220 can include a bottom bar 221, a top bar 222 connected to the bottom bar 221, and one or more vertical supports 223 connecting the bottom bar 221 to the top bar 222. In some exemplary embodiments, one or both of the bottom bar 221 and the top bar 222 can be rigid bars. If the bottom bar 221 and/or top bar 222 is rigid, the bar(s) 221, 222 may have an elastic modulus of, for example, 190-210 GPa, and comprise exemplary materials such as stainless steel. In some exemplary embodiments, the rigid portion 220 may directly attach to the feederhouse 116 of the harvester 110 in a known manner.

The first conformable portion 230 flexibly couples to the rigid portion 220 and may be located on a first lateral side 224 of the rigid portion 220. A first resilient material 240 flexibly couples the first conformable portion 230 to the rigid portion 220 and allows at least about 1.5° of reversible deflection. The first resilient material 240 may be disposed in a break B between the rigid portion 220 and the first conformable portion 230. It should be appreciated that the break B is not illustrated to scale in FIGS. 2-4, and the portions 220, 230 may have only a slight break of from about 2 inches to about 6 inches therebetween, but the break B can be larger, if necessary. As used herein, the degree of "reversible deflection" of the first resilient material 240 is with reference to a width axis WA of the header frame 210 so the conformable portion 230 can vertically conform to the terrain and maintain a constant cut as the harvester 100 traverses a field, with the first resilient material 240 able to return to a resting, undeflected state when the rigid portion 220 and first conformable portion 230 are both supported on the same plane. In this sense, the portion 230 is "conformable" due to the ability of the portion 230 to conform to the terrain as the first resilient material 240 reversibly deflects in either direction responsively to changes in the terrain. Further, the first material 240 is "resilient" in the sense that the first material 240 has a yield strength that allows at least 1.5° of reversible deflection in either direction, such as from about 5 degrees (5°) to about 8 degrees (8°) of reversible deflection, before the first material 240 plastically, i.e., irreversibly, deforms. For example, the first resilient material 240 may comprise a spring steel having an elastic modulus of from about 60 GPa to about 180 GPa and have a leaf-like shape; in some exemplary embodiments, the first resilient material 240 may also, or alternatively, comprise an elastomer such as rubber or urethane. It should be appreciated that the material composition, material properties and/or shape of the first resilient material 240, such as the elastic modulus, may be chosen to impart desired conforming behavior to the first conformable portion 230 as the harvester 100 traverses a field. In some exemplary embodiments, the first resilient material 240 may comprise a plurality of materials and/or sub-portions that are bonded or otherwise held together to act in unison. In some exemplary embodiments, a mechanical stop (not shown) may also be included on or adjacent to the first conformable portion 230 to limit the deflection of the first resilient material 240 to a desired amount, such as 5° in either direction.

In some exemplary embodiments, a first material end 241 of the first resilient material 240 may be mounted to the bottom bar 221 of the rigid portion 220 by a mounting bracket 251 bolted to the bottom bar 221. Similarly, a second material end 242 of the first resilient material 240 may be mounted to a bottom bar 231 of the first conformable portion 230 by a mounting bracket 252 that is bolted to the bottom bar 231. The bottom bar 231 of the first conformable portion 230 may be connected to a top bar 232 of the first conformable portion 230 by a plurality of vertical supports 233. The bottom bar 231 and/or the top bar 232 of the first conformable portion 230 may be rigid. In this sense, the bottom bar 231 may also be referred to as a "first rigid bar" and the top bar 232 may be referred to as a "second rigid bar." It should be appreciated that the first resilient material 240 may, in some embodiments, be mounted to the top bars 222, 232 of the portions 220, 230 rather than the bottom bars 221, 231.

In some exemplary embodiments, the first conformable portion 230 may be cantilevered to the rigid portion 220 by the first resilient material 240 so the first conformable portion 230 may exhibit "floating" behavior on the terrain as the agricultural harvester 100 travels across a field. The mounting brackets 251, 252 mounting the ends 241, 242 of the first resilient material 240 to the bottom bar 231 may form constrained regions of the first resilient material 240 adjacent to the mounting brackets 251, 252, with the reversible deflection of the first resilient material 240 generally occurring between the mounting brackets 251, 252. In some exemplary embodiments, the bottom bar 231 of the first conformable portion 230 may be tapered from a first lateral end 234 of the bottom bar 231 to a second lateral end 235 of the bottom bar 231 so a height H1 of the bottom bar 231 decreases from, for example, 6 inches at the first lateral end 234 to less than 1 inch at the second lateral end 235.

Referring specifically now to FIG. 2, the header 200 is shown when the rigid portion 220 and the first conformable portion 230 are both on even terrain, i.e., the portions 220, 230 are both supported by a common planar surface. When the portions 220, 230 are both on even terrain, a rigid portion lateral axis RLA defined by the rigid portion 220 and a first conformable portion lateral axis CLA1 defined by the first conformable portion 230 can be coaxial or parallel to one another, as shown. In such a scenario, the first resilient material 240 is generally unflexed and non-deflected, which may be referred to as being in an "undeflected state."

Referring specifically now to FIGS. 3-4, the header 200 is shown when the rigid portion 220 and the first conformable portion 230 are on uneven terrain, causing the first resilient material 240 to deflect upward (shown in FIG. 3) or deflect downward (shown in FIG. 4). As can be appreciated from FIGS. 3-4, the degree and direction of deflection of the first resilient material 240 will depend on the differences in the respective plane(s) supporting the rigid portion 220 and the first conformable portion 230. As shown in FIG. 3, for example, the first conformable portion 230 can exhibit a deflection angle Da1 relative to the width axis WA of about 5° when the first conformable portion 230 is supported by terrain that is elevated about 5° relative to the terrain supporting the rigid portion 220. Similarly, the deflection angle Da1 of the first conformable portion 230 relative to the width axis WA can also be about 5° when the first conformable portion 230 is supported by terrain that is about 5° below the terrain supporting the rigid portion 220, as shown in FIG. 4. By having the resilient material 240 able to deflect in response to differences in the terrain supporting the rigid portion 220 and the first conformable portion 230, the first conformable portion 230 is able to passively conform to terrain changes so the carried harvesting element(s) 120 can passively re-position to the terrain and produce an even cut as the harvester 100 traverses the field.

In contrast to a hinge, which tends to pivot or rotate about an axis, the first resilient material 240 allows the first conforming portion 230 to have greater conformability to the terrain since the deflection of the first conforming material 240 allowing movement of the first conforming portion 230 is not bound to pivoting or rotation about an axis. This difference may be particularly pronounced as the header 200 travels across very irregular terrains with several non-planar shapes, such as hills with ditches or divots. Thus, the first conforming portion 230 may, in some exemplary embodiments, be flexibly coupled to the rigid portion 220 without a hinge or similar element.

In some exemplary embodiments, the header 200 can include a first adjusting actuator 260 coupled to the rigid portion 220 and the first conformable portion 230 to keep the first resilient material 240 in the undeflected state when, for example, the rigid portion 220 is raised or lowered by the harvester 100. The first adjusting actuator 260 may be, for example, a hydraulic, pneumatic, or electric actuator coupled to the top bar 222 of the rigid portion 220 and the bottom bar 231 of the first conformable portion 230 so extension or retraction of an actuator rod 261 of the first adjusting actuator 260 can return the first resilient material 240 from deflected states back to the undeflected state. For example, if the rigid portion 220 is raised by, for example, the harvester 100, the first conformable portion 230 will tend to droop due to the weight of the first conformable portion 230 tending to deflect the first resilient material 240 in response to the height difference between the respective mounting points (brackets 251, 252) of the first resilient material 240 on the rigid portion 220 and the first conformable portion 230. In such a scenario, the first adjusting actuator 260 can retract the actuator rod 261 to account for the height difference and return the first resilient material 240 to the undeflected state.

Optionally, the header 200 may include a rotation lock 270 coupled to the rigid portion 220 and the first conformable portion 230 to prevent the first conformable portion 230 from rotating about the width axis WA of the header 200. For example, the header 200 may be configured such that a weight distribution of the header frame 210 is greater at a front of the header frame 210 compared to a back of the header frame 210, i.e., the header frame 210 is "front-heavy." The rigid portion 220 and the first conformable portion 230 may, in some exemplary embodiments, also be flexibly coupled to one another at the back of the header frame 210. In either scenario, the configuration of the header frame 210 tends to cause the first resilient material 240 to deflect and tilt toward the front of the header frame 210. The rotation lock 270 can, for example, include two or more telescoping bars with non-circular cross-sections or another element that can slide relative to the width axis WA, to account for deflection of the first resilient material 240, while also being coupled to the rigid portion 220 and the first conformable portion 230 in a manner that substantially prevents tilting of the first conformable portion 230 in a back-to-front direction. In some exemplary embodiments, the rotation lock 270 can have a completely locked state where the rotation lock 270 also does not slide relative to the width axis WA so the rotation lock 270 completely locks movement of the first conformable portion 230 relative to the rigid portion 220. The rotation lock 270 may be placed in the completely locked state by, for example, inserting a locking pin (not shown) or other element in the rotation lock 270 to prevent sliding.

Figure 5:
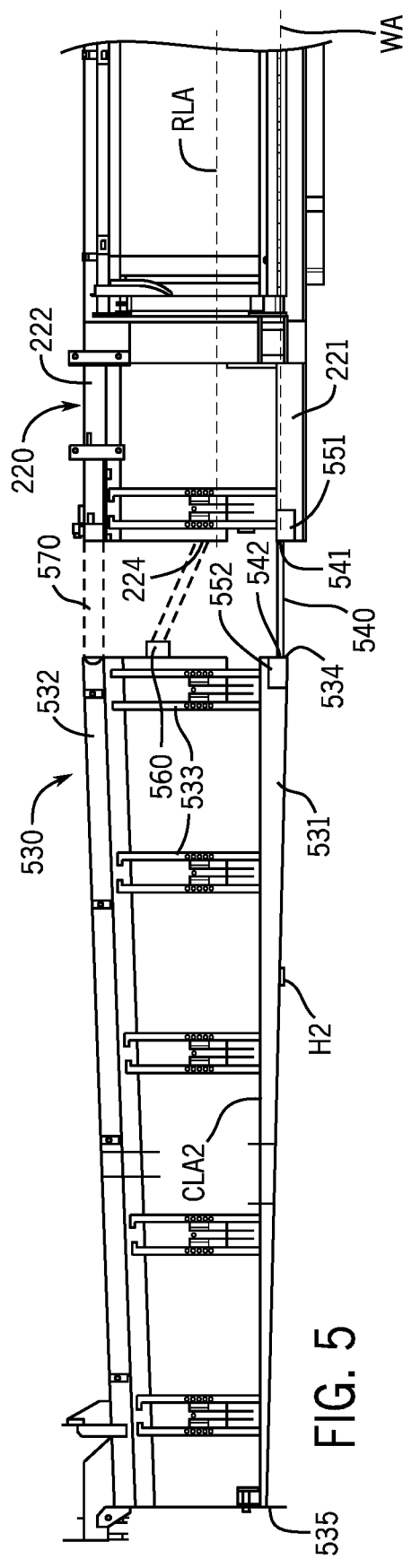
FIG. 5 is a rear view of a portion of the flexible header frame shown in FIG. 2 with a second resilient material in an undeflected state.

Referring now to FIGS. 5-7, another portion of the header 200 is shown that illustrates the rigid portion 220 with a second conformable portion 530 flexibly coupled to the rigid portion 220 by a second resilient material 540, similarly to the first conformable portion 230. As can be seen, the second conformable portion 530 can be substantially similar to the first conformable portion 230. In some exemplary embodiments, the second resilient material 540 is identical to the first resilient material 240 so the first conformable portion 230 and the second conformable portion 530 display similar conforming behavior to irregular terrain. In some exemplary embodiments, the second resilient material 540 may be different from the first resilient material 240 so the second conformable portion 530 conforms to terrain differently than the first conformable portion 230.

The second conformable portion 530 flexibly couples to the rigid portion 220 and may be located on a second lateral side 225 of the rigid portion 220. The second resilient material 540 flexibly couples the second conformable portion 530 to the rigid portion 220 and allows at least about 1.5° of reversible deflection, similarly to the first resilient material 240. Similar to FIGS. 2-4, an illustrated second break B2 between the rigid portion 220 and the second conformable portion 530 is exaggerated in FIGS. 5-7, i.e., not drawn to scale. Since the second resilient material 540 can be substantially similar to the first resilient material 240, further description of the second resilient material 540 is omitted for brevity.

In some exemplary embodiments, a first material end 541 of the second resilient material 540 may be mounted to the bottom bar 221 of the rigid portion 220 by a mounting bracket 551 bolted to the bottom bar 221. Similarly, a second material end 542 of the second resilient material 540 may be mounted to a bottom bar 531 of the second conformable portion 530 by a mounting bracket 552 that is bolted to the bottom bar 531. The bottom bar 531 of the second conformable portion 530 may be connected to a top bar 532 of the second conformable portion 530 by a plurality of vertical supports 533. The bottom bar 531 and/or the top bar 532 of the second conformable portion 530 may be rigid, similar to the bottom bar 221 and top bar 222 of the rigid portion 220. In this sense, the bottom bar 531 may also be referred to as a "third rigid bar" and the top bar 532 may be referred to as a "fourth rigid bar." It should be appreciated that the second resilient material 540 may, in some embodiments, be mounted to the top bars 222, 532 of the portions 220, 530 rather than the bottom bars 221, 531.

In some exemplary embodiments, the second conformable portion 530 may be cantilevered to the rigid portion 220 by the second resilient material 540 so the second conformable portion 530 may exhibit "floating" behavior over or on the terrain as the agricultural harvester 100 travels across a field. The mounting brackets 551, 552 mounting the ends 541, 542 of the second resilient material 540 to the bottom bar 231 may form constrained regions of the second resilient material 540 adjacent to the mounting brackets 551, 552, with the reversible deflection of the second resilient material 540 generally occurring between the mounting brackets 551, 552. In some exemplary embodiments, the bottom bar 531 of the second conformable portion 530 may be tapered from a first lateral end 534 of the bottom bar 531 to a second lateral end 535 of the bottom bar 531 so a height H2 of the bottom bar 531 decreases from, for example, 6 inches at the first lateral end 534 to less than 1 inch at the second lateral end 535.

Referring specifically now to FIG. 5, the header 200 is shown when the rigid portion 220 and the second conformable portion 530 are both on even terrain, i.e., the portions 220, 530 are both supported by a common planar surface. When the portions 220, 530 are both on even terrain, the rigid portion lateral axis RLA defined by the rigid portion 220 and a second conformable portion lateral axis CLA2 defined by the second conformable portion 530 can be coaxial or parallel to one another, as shown. In such a scenario, the second resilient material 540 is generally unflexed and non-deflected, which may be referred to as being in an "undeflected state."

Referring specifically now to FIGS. 6-7, the header 200 is shown when the rigid portion 220 and the second conformable portion 530 are on uneven terrain, causing the second resilient material 540 to deflect upward (shown in FIG. 6) or deflect downward (shown in FIG. 7), similarly to the first resilient material 240. As can be appreciated from FIGS. 6-7, the degree and direction of deflection of the second resilient material 540 will depend on the differences in the respective plane(s) supporting the rigid portion 220 and the second conformable portion 530. As shown in FIG. 6, for example, the second conformable portion 530 can exhibit a deflection angle Dα2 relative to the width axis WA of about 5° when the second conformable portion 530 is supported by terrain that is elevated about 5° relative to the terrain supporting the rigid portion 220. Similarly, the deflection angle Dα2 of the second conformable portion 530 relative to the width axis WA can also be about 5° when the second conformable portion 530 is supported by terrain that is about 5° below the terrain supporting the rigid portion 220, as shown in FIG. 7. By having the resilient material 540 able to deflect in response to differences in the terrain supporting the rigid portion 220 and the second conformable portion 530, the second conformable portion 530 is able to passively conform to terrain changes so the carried harvesting element(s) 120 can passively re-position to the terrain and produce an even cut as the harvester 100 traverses the field.

The header 200 can further include a second adjusting actuator 560 coupled to the rigid portion 220 and the second conformable portion 530, similarly to the previously described first adjusting actuator 260. The header 200 can also further include a rotation lock 570 coupled to the rigid portion 220 and the second conformable portion 530, similarly to the previously described rotation lock 270. Since the respective functions and structures of the second adjusting actuator 560 and rotation lock 570 are similar to those of the first adjusting actuator 260 and rotation lock 270, further description of the second adjusting actuator 560 and rotation lock 570 is omitted for brevity.

Figure 8:
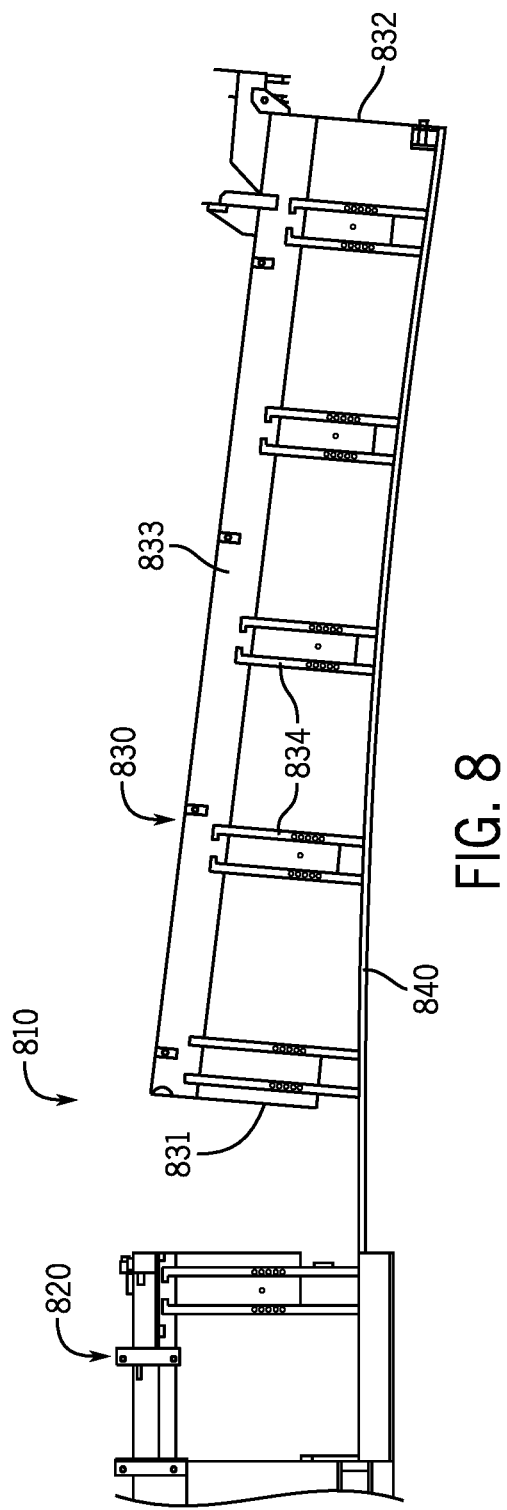
FIG. 8 is a rear view of a portion of another exemplary embodiment of a header frame.

In another exemplary embodiment, and referring now to FIG. 8, the header 200 includes a header frame 810 with a rigid portion 820 and a first conformable portion 830 that is flexibly coupled to the rigid portion 820 by a first resilient material 840, similarly to the previously described header frame 210. Unlike the header frame 210, the first resilient material 840 of the header frame 810 essentially forms the bottom of the first conformable portion 830, rather than the bottom of the first conformable portion 830 being a rigid bar. By having the first resilient material 840 form the bottom of the first conformable portion 830, and mounting the other components of the first conformable portion 830 to the first resilient material 840, the first conformable portion 830 can be quite flexible and able to conform to terrain. The header frame 810 can also have a second conformable portion (not shown) with a second resilient material that essentially forms the bottom of the second conformable portion. Alternatively, the first resilient material 840 and/or second resilient material may essentially form the top of the first conformable portion 830 or second conformable portion, respectively. In some exemplary embodiments, the first resilient material 840 may span an entire width of the first conformable portion 830 from a first lateral end 831 to a second lateral end 832, as shown, and be connected to a top bar 833, which in some embodiments may be rigid, by a plurality of vertical supports 834.

While exemplary embodiments have been described herein, it is expressly noted that these embodiments should not be construed as limiting, but rather that additions and modifications to what is expressly described herein also are included within the scope of the present disclosure. Moreover, it is to be understood that the features of the various embodiments described herein are not mutually exclusive and can exist in various combinations and permutations, even if such combinations or permutations are not made express herein, without departing from the spirit and scope of the present disclosure. Any public disclosures, patent applications, journal articles or other disclosures identified or cited in this application are incorporated by reference in their entireties.

The invention claimed is:

1. An agricultural header, comprising:
   a header frame including:
      a rigid portion;
      a first conformable portion flexibly coupled to the rigid portion by a first resilient material that allows at least about 1.5° of reversible deflection; and
      a second conformable portion flexibly coupled to the rigid portion by a second resilient material that allows at least about 1.5° of reversible deflection; and
   at least one harvesting element carried by the header frame;
   wherein the first conformable portion is positioned on a first lateral side of the rigid portion, the second conformable portion is positioned on a second lateral side of the rigid portion, opposite the first lateral side, the first resilient member extends across a first lateral gap between the first conformable portion and the rigid portion, the second resilient member extends across a second lateral gap between the second conformable portion and the rigid portion, and at least one of the first conformable portion and the second conformable portion is flexibly coupled to the rigid portion without using a pivot.

2. The agricultural header of claim 1, wherein at least one of the first resilient material and the second resilient material allows from about 5° to about 8° of reversible deflection.

3. The agricultural header of claim 2, wherein the first resilient material and the second resilient material both allow from about 5° to about 8° of reversible deflection.

4. The agricultural header of claim 1, wherein at least one of the first resilient material and the second resilient material comprises at least one of spring steel and an elastomer.

5. The agricultural header of claim 1, wherein the first conformable portion includes a first rigid bar connected to a second rigid bar and the second conformable portion includes a third rigid bar connected to a fourth rigid bar.

6. The agricultural header of claim 5, wherein the first resilient material flexibly couples the first rigid bar of the first conformable portion to the rigid portion and the second resilient material flexibly couples the third rigid bar of the second conformable portion to the rigid portion.

7. The agricultural header of claim 1, wherein the first conformable portion includes one of a rigid first top bar and a rigid first bottom bar connected to the first resilient material and the second conformable portion includes one of a rigid second top bar and a rigid second bottom bar connected to the second resilient material.

8. The agricultural header of claim 1, wherein the header frame defines a front and a back, the header frame further comprising a rotation lock coupled to the rigid portion and the first conformable portion and configured to prevent the first conformable portion from tilting in a back-to-front direction.

9. The agricultural header of claim 1, wherein the angle of reversible deflection of at least one of the first resilient material and the second resilient material is with respect to a width axis of the header frame.

10. An agricultural harvester, comprising:
    a chassis; and
    a header carried by the chassis, the header including:
       a header frame having a rigid portion, a first conformable portion flexibly coupled to the rigid portion by a first resilient material that allows at least about 1.5° of reversible deflection, and a second conformable portion flexibly coupled to the rigid portion by a second resilient material that allows at least about 1.5° of reversible deflection; and
       at least one harvesting element carried by the header frame;
    wherein the first conformable portion is positioned on a first lateral side of the rigid portion, the second conformable portion is positioned on a second lateral side of the rigid portion, opposite the first lateral side, the first resilient member extends across a first lateral gap between the first conformable portion and the rigid portion, the second resilient member extends across a second lateral gap between the second conformable portion and the rigid portion, and at least one of the first conformable portion and the second conformable portion is flexibly coupled to the rigid portion without using a pivot.

11. The harvester of claim 10, wherein at least one of the first resilient material and the second resilient material allows from about 5° to about 8° of reversible deflection.

12. The harvester of claim 11, wherein the first resilient material and the second resilient material both allow from about 5° to about 8° of reversible deflection.

13. The harvester of claim 10, wherein at least one of the first resilient material and the second resilient material comprises at least one of spring steel and an elastomer.

14. The harvester of claim 10, wherein the first conformable portion includes a first rigid bar connected to a second rigid bar and the second conformable portion includes a third rigid bar connected to a fourth rigid bar.

15. The harvester of claim 14, wherein the first resilient material flexibly couples the first rigid bar of the first conformable portion to the rigid portion and the second resilient material flexibly couples the third rigid bar of the second conformable portion to the rigid portion.

16. The harvester of claim 10, wherein the first conformable portion includes one of a rigid first top bar and a rigid first bottom bar connected to the first resilient material and the second conformable portion includes one of a rigid second top bar and a rigid second bottom bar connected to the second resilient material.

17. The harvester of claim 10, wherein the header frame defines a front and a back, the header frame further comprising a rotation lock coupled to the rigid portion and the first conformable portion and configured to prevent the first conformable portion from tilting in a back-to-front direction.

18. The harvester of claim 10, wherein the angle of reversible deflection of at least one of the first resilient material and the second resilient material is with respect to a width axis of the header frame.

* * * * *